Patented June 7, 1927.

1,631,729

UNITED STATES PATENT OFFICE.

JOSEPH A. JEFFERY AND EARLE T. MONTGOMERY, OF DETROIT, MICHIGAN, ASSIGNORS, BY MESNE ASSIGNMENTS, TO CHAMPION PORCELAIN COMPANY, OF DETROIT, MICHIGAN, A CORPORATION OF MICHIGAN.

CERAMIC INSULATING MATERIAL.

No Drawing.       Application filed February 24, 1919. Serial No. 278,879.

Our invention relates to the production of insulating material and the raw batch thereof. The invention particularly has for its object to provide an insulating material of the porcelain type, which has high electrical resistance at atmospheric temperatures and at all higher temperatures up to a bright red heat. The material of our invention also possesses high mechanical strength, a vitreous structure throughout the mass and a low coefficient of thermal expansion. By reason of these properties the articles composed of our material are exceedingly valuable when used as insulators under conditions where a considerable resistance to impact, compression, tension, vibration, and other mechanical strains, imperviousness to liquids and gases, and resistance to sudden temperature changes are required. The material of our invention is particularly valuable where the articles composed thereof are subjected to electrical stress at high temperatures and to sudden and wide changes of temperature, since the material has a high dielectric strength over a wide range of temperature, and a low coefficient of thermal expansion; and hence may be subjected to the said conditions without serious electrical leakage or mechanical breakage of the insulator. Our invention thus provides a material for insulators to be used for a wide variety of purposes, but particularly is the invention of value when applied to insulators for the spark plugs used in internal combustion engines, which require a high hot dielectric strength and a low coefficient of thermal expansion to efficiently perform their functions.

Insulators of the porcelain type in general use do not possess the property of high dielectric strength at high temperatures because of the use of feldspar in large quantities, or other alkali metal compounds, as fluxes in the raw batch, which, on firing, results in the production of alkali metal silicates in the material of the insulator, and consequently the electrical resistance of the insulator decreases rapidly as the temperature increases.

We have overcome this defect in the porcelain type of insulator well known in the art by using, in compounding the raw batch, the alkaline earth metal oxides as fluxes. These oxides may be introduced through the use of a number of different raw materials, such as whiting, or other calcium carbonates, calcium oxide, calcium hydrate, and other calcium compounds yielding the oxide or a silicate on heating; magnesite or other magnesium carbonates, magnesium oxide, the hydrate of magnesia, either the artificial hydrate or mineral hydrate Brucite, talc, and other magnesium compounds yielding the oxide or a silicate on heating; dolomite or other mixed calcium and magnesium carbonates, dolomitic oxide, dolomitic hydrate and other mixed calcium and magnesium compounds yielding the oxides or silicates on heating.

In compounding the raw batch preparatory to forming and firing, we use the maximum percentage of one or more of the alkaline earth oxides, or of their equivalents, possible under the conditions of firing commonly found in the ceramic art, in combination with the other ingredients, to give to the resultant material, after firing, the requisite properties. In the insulators of the porcelain type commonly known in the art, the fluxes used in their raw batches are the alkali oxides, which, producing alkali metal silicates in the resulting material upon firing, reduce the dielectric strength at high temperatures and increase the coefficient of expansion. In carrying out our invention we thus, in our raw batch, either eliminate or reduce to the least possible amount, all of the alkali metal fluxes, and while both alkali and alkaline earth fluxes may be used, the exact proportion of one to the other will be governed by the use for which the product is intended and the properties, or their degrees, which it is desired to secure in the article to be produced, and this proportion is particularly governed by the firing conditions that are commercially feasible in the ceramic art. However, in utilizing the fluxing compounds, we use the maximum amount of the oxides of the alkaline earth metals, or their equivalents, and the minimum amount of the oxides of the alkali metals, or their equivalents, possible, in order to secure the requisite properties desired to be produced in the material resulting after firing, particularly as to the hot dielectric strength and resistance to sudden temperature changes. Thus the amount of alkali metal is kept low, relative to the amount customarily used in insulator porcelains. The higher the percentage of alkaline earth oxides used as a flux, together with a high clay content, the higher will be the dielectric strength of the insulator at high temperatures.

In compounding the raw batch in its preferred form, preparatory to forming and firing, we mix together 10 to 15 per cent of pulverized potter's flint, 3 to 10 per cent of pulverized feldspar, 7 to 10 per cent of pulverized talc, 5 to 10 per cent of potter's whiting and the balance, up to 100 per cent, of clays, consisting either of kaolin alone or a mixture of kaolins and ball clays. We find that this composition when suitably prepared in the raw condition by the usual processes of milling, blunging and filter-pressing, is plastic and may be worked and formed into the desired insulator shapes in preparation for the kiln by any of the processes known to the art, and that upon the application of the raw glaze and firing in a kiln to a suitable temperature it becomes mechanically strong, vitreous throughout the mass, impervious to liquids and gases and develops a proper glaze. The proportions of raw materials, or of their equivalents, may be varied within the limitations specified and yet such batch compositions and their end products will be within the scope of our invention. Variations in the amounts are used according to the properties that are required in the resultant material of the insulator.

The flint, one of the non-plastic ingredients of the raw batch, is used as a means of controlling both the drying and firing shrinkage and as an aid to vitrification during the firing process by entering into the silicates formed. By potter's flint we mean any material consisting principally of free silica. The flint, when used in combination with the other ingredients in the proportions given above, no longer exists, after firing, as free silica or quartz but goes into solution or enters into combination with the other ingredients during the process of firing, so that practically none of the flint, or the free quartz introduced in small amounts in the clays, is left as such in the finished product, but is found to have gone into solution in the glassy matrix of the body; that is, there is such a balanced relation between the proportion of flint to the other ingredients, that while giving the mixture the requisite drying and firing properties, the resulting final product contains no free flint or quartz.

The feldspar used is introduced in the smallest amount consistent with a reasonable firing range and which will at the same time produce a body on which the raw glaze will properly mature during firing. As one of the non-plastic ingredients of the body it has a similar effect to the flint in controlling the drying shrinkage of the body. As feldspar is a slow acting flux, that is, it softens over a long firing range, it is desirable that a certain small percentage of it be used to lengthen the firing range of the body.

The talc and whiting used are introduced in as large a total amount as is required to give the desired properties to the final product and yet is consistent with commercial firing conditions.

It will be noted from the above that the talc and whiting together with the flint and feldspar specified, gives a total of non-plastic raw materials in the body of approximately 35 per cent, making it possible to add raw clay to make up the remaining unassigned 65 per cent. This gives, from the practical manufacturing standpoint, a proper balance between non-plastic and plastic ingredients in the raw batch and makes possible a high clay content which contributes to the desired properties in the final product without causing inordinate shrinkage in the body. As indicated above, the clays are introduced in the largest total amount possible, up to approximately 65%, the exact amount being determined by that percentage not already assigned to the other ingredients, for the reasons stated in the discussion of each separate ingredient. Raw clays, added in this amount, provide ample plasticity and good working properties in the raw body, and on firing to a suitable temperature, there results from this high clay content in the raw batch, a high content of sillimanite in the final product, which contributes to its high dielectric strength at high temperatures, to its low co-efficient of thermal expansion and to its other desirable properties.

The end products which, on firing, result from the raw batch compositions falling within the limitations specified above, are as follows:—sillimanite, amorphous, crystalline, or both, in large amount resulting from the breaking down of the clays into sillimanite and free silica; a glassy matrix, consisting of akaline earth metal silicates and alkali metal silicates, the former being in excess of the latter; and possibly dissolved silica. The amount of sillimanite crystals produced on firing to a suitable temperature, as mentioned above, so as to dissociate the clay and crystallize a large portion of the sillimanite, varies with the composition but is well above 20% with a batch such as described above. In this glassy matrix there has been either taken into solution, or into combination in one or more of the silicates present, the silica originally added as potter's flint or as an impurity in the clays, and the silica mentioned above which splits off as one of the dissociation products when the clays, under the influence of heat, break up into sillimanite and silica.

It is to be understood that in compounding the raw batch there may be used one or more compounds of the particular class named. In order to obviate prolixity in the claims, we have specified a single compound of a particular class but it is to be understood that the claim covers and comprehends in each case one or more compounds of that class and that we may use a plurality of compounds of the class named and yet be operating within the scope of the claim in question.

It is to be further understood that, in the resultant insulating material, the end products have not been determined with absolute certainty, and may have considerable range of variation under varying conditions. Calculation of the end products is based upon an ultimate chemical analysis and upon a petrographic analysis. In some of the claims, relations between certain of the end products are expressed by stating them in terms of the oxides shown by chemical analysis, while some of the characteristics of the invention are defined in some of the claims by reference to the results of petrographic analysis.

In technical works describing porcelains and similar materials, such as the article by Klein in Technical Paper No. 80 of the Bureau of Standards, the term sillimanite is applied to crystals having petrographic characteristics of natural sillimanite, and to the aluminum silicate, both amorphous and crystalline, which is formed when clay is dissociated into excess silica and an aluminum silicate higher in alumina than the original clay. In the appended claims the terms "sillimanite" and "sillimanite crystals" are to be understood as covering an aluminum silicate such as results from such dissociation of clay, and crystals having petrographic properties approaching those of natural sillimanite as closely as the crystals resulting from such dissociation of clay.

We claim:

1. A ceramic material consisting of sillimanite crystals and a glassy matrix.

2. A ceramic material consisting of sillimanite crystals and a glassy matrix, the glassy matrix containing an alkaline earth metal.

3. A ceramic material consisting of sillimanite crystals and a glassy matrix and having a low alkali metal content.

4. A ceramic high temperature insulating material consisting of sillimanite and a glassy matrix.

5. A fused material containing aluminum silicate, aluminum silicate crystals, and being low in alkali content.

6. A porcelain body formed from a mixture containing clay and sillimanite crystals fused to vitrifaction.

7. A ceramic material containing at least 20 per cent of sillimanite crystals and having a low alkali metal content.

8. A ceramic material containing at least 20 per cent of aluminum silicate crystals, and having a low alkali metal content.

9. A porcelain body characterized by being vitrified, homogeneous, of low expansion and high electrical insulation under heat and produced from a mixture containing clay and a flux, low in alkali content, which will give low expansion in the body and takes the place at least partially of feldspar usually employed as a flux.

10. A porcelain body characterized by being vitrified, homogeneous, of low expansion and high electrical insulation under heat, the free silica usually present in porcelain bodies being at least partially replaced by an artificial silicate.

11. A porcelain body fused to vitrifaction containing in combination silica, alumina, alkali and alkaline earth, and having the characteristics of high insulation under heat, low expansion, low in alkali content, and substantially free from free silica.

12. A porcelain insulator body consisting of sillimanite and a glassy matrix, the glassy matrix containing dissolved silica.

13. A porcelain insulator body consisting of sillimanite and a glassy matrix, the glassy matrix including a material amount of alkaline earth metal silicate.

14. A porcelain insulator body consisting of sillimanite and a glassy matrix, the glassy matrix comprising a material amount of alkaline earth metal silicate and a material amount of alkali metal silicate.

15. A porcelain insulator body consisting of sillimanite and a glassy matrix, the glassy matrix comprising an alkaline earth metal silicate and dissolved silica.

16. A porcelain insulator body consisting of sillimanite and a material amount of alkali metal silicate, the amount of the sillimanite being in excess of the amount of the alkali metal silicate.

17. A porcelain insulator body consisting of sillimanite, an alkaline earth metal silicate and an alkali metal silicate, the amount of the alkaline earth metal silicate being in excess of the amount of the alkali metal silicate.

18. A porcelain insulator body consisting of sillimanite and a glassy matrix, the glassy matrix comprising a material amount of alkaline earth metal silicate and a material amount of alkali metal silicate and dissolved silica.

19. A porcelain insulator body consisting of sillimanite and a glassy matrix, the glassy matrix comprising an alkaline earth metal silicate and an alkali metal silicate, the alkaline earth metal silicate being in excess of the alkali metal silicate.

20. A porcelain insulator body comprising sillimanite and a glassy matrix, the glassy matrix comprising silica, an alkaline earth metal silicate and an alkali metal silicate, the alkaline earth metal silicate being in excess of the alkali metal silicate.

21. A porcelain insulator body comprising sillimanite, silica and a material amount of alkaline earth metal silicate, the amount of the sillimanite being in excess of the amount of the alkaline earth metal silicate, and substantially all of the silica being dissolved.

22. A porcelain insulator body comprising sillimanite, a material amount of alkaline earth metal silicate and a material amount of alkali metal silicate, the amount of the sillimanite being in excess of the total amount of the said other ingredients.

23. A porcelain spark plug body consisting of sillimanite, an alkaline earth metal silicate and an alkali metal silicate, the amount of the sillimanite being in excess of the total amount of the said other ingredients, and the amount of the alkaline earth metal silicate being in excess of the amount of the alkali metal silicate.

24. A porcelain insulator body formed of aluminum silicate and a flux of low alkali content, said body having the characteristics of low expansion and high insulation under heat.

25. A porcelain insulator body having the characteristics of low expansion, high electrical insulation under heat, and high mechanical strength, and formed of clay and a flux of low alkali content fused to vitrifaction.

26. A porcelain insulator body having the characteristics of high electrical insulation and low expansion, said body containing aluminum silicate and a flux comprising magnesium silicate.

27. A porcelain insulator body having the characteristics of low thermal expansion, high mechanical strength and high electrical insulation at high temperatures, said body containing aluminum silicate and a flux comprising magnesium silicate.

28. A porcelain insulator body having the characteristics of low expansion, high electrical insulation under heat, and high mechanical strength, and formed of clay and a flux showing from chemical analysis silica and an alkaline earth.

29. A porcelain insulator body having the characteristics of low expansion and high electrical insulation under heat, containing aluminum silicate crystals and alkaline earth metal in substantial quantities and having a low alkali metal content, the aluminum silicate crystals being in excess of the alkaline earth metal.

30. A porcelain spark plug body containing aluminum silicate and alkaline earth metal in substantial quantities and substantially free from free silica.

31. A porcelain spark plug body comprising sillimanite and a material amount of alkaline earth metal silicate, the amount of sillimanite being in excess of the alkaline earth metal silicate.

32. A porcelain spark plug body containing aluminum silicate and alkaline earth metal in substantial quantities, of low alkali content and substantially free from free silica.

33. The raw batch of a ceramic insulating vitreous material of the porcelain type, comprising a mixture of 10 to 15 per cent of potter's flint, 3 to 10 per cent of alkali metal compound and 12 to 20 per cent of alkaline earth metal compounds, and the balance up to 100 per cent of clay.

34. The raw batch of a ceramic insulating material of the porcelain type, comprising a mixture of approximately 35 per cent of potter's flint, alkali metal compound and alkaline earth metal compound and approximately 65 per cent of raw clay, the alkaline earth metal compound exceeding the amount of the alkali metal compound.

35. The raw batch of a ceramic material of the porcelain type comprising 60 to 70% of clay, 12 to 20% of alkaline earth metal compound flux and the balance up to 100% of flint together with a small amount of alkali metal flux.

36. The raw batch of a ceramic material comprising 60 to 70% of clay, 10 to 15% flint and the balance up to 100% of alkaline earth metal and alkali metal fluxes, the alkaline earth metal flux being in excess of the alkali metal flux.

37. The process of making porcelain which consists in molding into shape and firing to vitrifaction a mixture containing clay and a flux of low alkali content and of high electrical insulation under heat and showing from chemical analysis silica and an alkaline earth.

38. The method of producing porcelain, which consists in forming and firing a batch which will contain clay and sillimanite at an intermediate stage of firing, and continuing the firing until the greatest practicable amount of sillimanite is formed from the clay.

39. The method of producing porcelain, which consists in forming and firing a batch which will contain clay and sillimanite at an intermediate stage of firing, and continuing the firing until the greatest practicable amount of sillimanite crystals is formed from the clay.

40. The method of producing porcelain, which consists in forming a batch containing aluminum silicate and alkaline earth metal compound, the aluminum silicate being in an amount more than twice that of the alkaline earth metal compound, and firing the batch to produce the greatest practicable amount of sillimanite.

41. The method of producing porcelain, which consists in forming a batch containing aluminum silicate and alkaline earth metal compound and alkali metal compound, the aluminum silicate being in excess of the total amount of said other two ingredients, and firing the batch to produce the greatest practicable amount of sillimanite.

In testimony whereof, we have hereunto signed our names to this specification.

JOSEPH A. JEFFERY.
EARLE T. MONTGOMERY.